United States Patent
Liao et al.

(10) Patent No.: US 12,262,080 B2
(45) Date of Patent: Mar. 25, 2025

(54) HDMI FIBER-OPTIC EXTENDER

(71) Applicant: WAVESPLITTER TECHNOLOGIES, INC., New Taipei (TW)

(72) Inventors: Wen-Shuo Liao, Taipei (TW); Jen-Hsiu Lu, New Taipei (TW)

(73) Assignee: WAVESPLITTER TECHNOLOGIES, INC., New Taipei (TW)

( * ) Notice: Subject to any disclaimer, the term of this patent is extended or adjusted under 35 U.S.C. 154(b) by 60 days.

(21) Appl. No.: 18/481,853

(22) Filed: Oct. 5, 2023

(65) Prior Publication Data

US 2024/0267587 A1  Aug. 8, 2024

(30) Foreign Application Priority Data

Feb. 3, 2023  (TW) .................................. 112103838

(51) Int. Cl.
*H04N 21/4363*  (2011.01)
*H04B 10/50*  (2013.01)
*H04B 10/60*  (2013.01)

(52) U.S. Cl.
CPC ..... *H04N 21/43635* (2013.01); *H04B 10/503* (2013.01); *H04B 10/60* (2013.01)

(58) Field of Classification Search
CPC . H04N 21/43635; H04B 10/503; H04B 10/60
See application file for complete search history.

(56) References Cited

U.S. PATENT DOCUMENTS

| | | | | |
|---|---|---|---|---|
| 2010/0011143 | A1* | 1/2010 | Chang | H04N 5/765 710/300 |
| 2012/0082249 | A1* | 4/2012 | Hsueh | H04L 7/0008 375/259 |
| 2012/0249871 | A1* | 10/2012 | Nguyen | H04N 7/102 348/E7.003 |

* cited by examiner

*Primary Examiner* — Kyu Chae
(74) *Attorney, Agent, or Firm* — Brooks Kushman P.C.

(57) ABSTRACT

An HDMI fiber-optic extender is for providing long-distance signal transmission between a signal transmitting device and a signal receiving device, and includes an HDMI optical transmitter and an HDMI optical receiver. The HDMI optical transmitter uses a tri-direction transmitter optical sub-assembly and a first tri-direction optical sub-assembly to convert HDMI signals (including three high-frequency data signals, a high-frequency clock signal, a low-frequency data signal and a low-frequency clock signal) received from the signal transmitting device into optical signals, and couples the optical signals onto a pair of single-core optical fibers of a fiber-optic assembly. The HDMI optical receiver uses a tri-direction receiver optical sub-assembly and a second tri-direction optical sub-assembly to convert the optical signals received from the fiber-optic assembly into the HDMI signals, and transmits the HDMI signals to the signal receiving device.

2 Claims, 6 Drawing Sheets

HDMI FIBER-OPTIC EXTENDER

CROSS-REFERENCE TO RELATED APPLICATIONS

This application claims priority to Taiwanese Patent Application No. 112103838, filed on Feb. 3, 2023, the disclosure of which is hereby incorporated by reference in its entirety.

TECHNICAL FIELD

The disclosure relates to an optical transceiver, and more particularly to a high-definition multimedia interface (HDMI) fiber-optic extender having high compatibility and high definition.

BACKGROUND

In order to solve the problem that high-definition multimedia interface (HDMI) video signals cannot be transmitted over long distances, HDMI fiber-optic extenders are used to extend the transmission distances of the HDMI video signals. A conventional HDMI fiber-optic extender includes a transmitter, a receiver, and a fiber-optic cable connected to the transmitter and the receiver. The transmitter includes a specific digital signal processor that encodes/compresses the HDMI video signals (in particular, using an encoding method to compress four HDMI video signals (R, G, B, clock) into a compressed signal), and transmits the compressed signal to the receiver via the fiber-optic cable, so as to achieve a high signal transmission rate (e.g., 10 Gbps to 25 Gbps) at a single wavelength. Then, the receiver uses a decoding method corresponding to the encoding method to decompress the compressed signal from the transmitter.

However, the compressed signal generated in the aforesaid way is prone to contain noise. In addition, in a scenario where the HDMI video signals are to be transmitted from a playback device (e.g., a DVD device) serving as the transmitter to a TV set serving as the receiver, the decompressed signal obtained by the TV set is prone to distortion because different brands of TV sets may have varying degrees of incompatibility with the playback device. Furthermore, when increasing the data rate and the resolution under the HDMI specification, it is necessary to redesign the specific digital signal processor, which consumes a lot of cost and time.

SUMMARY

Therefore, an object of the disclosure is to provide a high-definition multimedia interface (HDMI) fiber-optic extender that can alleviate at least one of the drawbacks of the prior art.

According to the disclosure, the HDMI fiber-optic extender is for providing long-distance signal transmission between a signal transmitting device and a signal receiving device. The HDMI fiber-optic extender includes a fiber-optic assembly, an HDMI optical transmitter and an HDMI optical receiver.

The fiber-optic assembly includes a first fiber-optic cable and a second fiber-optic cable. Each of the first and second fiber-optic cables includes a single-core optical fiber, and two connection plugs respectively connected to two opposite ends of the single-core optical fiber.

The HDMI optical transmitter is formed with a first connection socket that is connected to one of the connection plugs of the first fiber-optic cable, and a second connection socket that is connected to one of the connection plugs of the second fiber-optic cable. The HDMI optical transmitter includes a first HDMI interface, a first serializer/deserializer, a first laser driver, a tri-direction transmitter optical sub-assembly, a first tri-direction optical sub-assembly and a first current to voltage converter. The first HDMI interface is configured to receive an HDMI input from the signal transmitting device. The HDMI input includes a first high-frequency data signal, a second high-frequency data signal, a third high-frequency data signal, a high-frequency clock signal, a first low-frequency data signal and a first low-frequency clock signal. The first to third high-frequency data signals and the high-frequency clock signal are related to video. The first low-frequency data signal and the first low-frequency clock signal are related to communication between the signal transmitting device and the signal receiving device. The first serializer/deserializer is connected to the first HDMI interface, and is configured to serialize the first low-frequency data signal and the first low-frequency clock signal from the first HDMI interface so as to generate a first control signal. The first laser driver is connected to the first HDMI interface and the first serializer/deserializer, and is configured to generate a first drive signal, a second drive signal, a third drive signal, a fourth drive signal and a fifth drive signal respectively based on the first control signal from the first serializer/deserializer and the first to third high-frequency data signals and the high-frequency clock signal from the first HDMI interface. The tri-direction transmitter optical sub-assembly is connected to the first laser driver, and is configured to generate a first optical signal, a second optical signal and a third optical signal respectively based on the first to third drive signals from the first laser driver, and to couple the first to third optical signals onto the first fiber-optic cable. The first to third optical signals have different wavelengths. The first tri-direction optical sub-assembly is connected to the first laser driver, and is configured to generate a fourth optical signal and a fifth optical signal respectively based on the fourth and fifth drive signals from the first laser driver, and to couple the fourth and fifth optical signals onto the second fiber-optic cable. The fourth and fifth optical signals have different wavelengths. The first current to voltage converter is connected to the first tri-direction optical sub-assembly and the first serializer/deserializer.

The HDMI optical receiver is formed with a third connection socket that is connected to the other one of the connection plugs of the first fiber-optic cable, and a fourth connection socket that is connected to the other one of the connection plugs of the second fiber-optic cable. The HDMI optical receiver includes a tri-direction receiver optical sub-assembly, a second tri-direction optical sub-assembly, a second current to voltage converter, a second laser driver, a second serializer/deserializer and a second HDMI interface. The tri-direction receiver optical sub-assembly is configured to receive the first to third optical signals from the first fiber-optic cable, and to convert the first to third optical signals respectively into a first current signal, a second current signal and a third current signal. The second tri-direction optical sub-assembly is configured to receive the fourth and fifth optical signals from the second fiber-optic cable, and to convert the fourth and fifth optical signals respectively into a fourth current signal and a fifth current signal. The second current to voltage converter is connected to the tri-direction receiver optical sub-assembly and the second tri-direction optical sub-assembly, and is configured to perform current to voltage conversion on the first to fifth current signals from the tri-direction receiver optical sub-assembly and the second tri-direction optical sub-assembly so as to respectively generate the first control signal, the first to third high-frequency data signals and the high-frequency clock signal. The second laser driver is connected to the second tri-direction optical sub-assembly. The second serializer/deserializer is connected to the second laser driver and the second current to voltage converter, and is configured to deserialize the first control signal from the second current to voltage converter so as to generate the first low-frequency data signal and the first low-frequency clock signal. The second HDMI interface is connected to the second current to voltage converter and the second serializer/deserializer, and is configured to transmit the first to third high-frequency data signals and the high-frequency clock signal from the second current to voltage converter and the first low-frequency data signal and the first low-frequency clock signal from the second serializer/deserializer to the signal receiving device.

When the second HDMI interface receives a second low-frequency data signal and a second low-frequency clock signal that are generated by the signal receiving device in response to the first low-frequency data signal and the first low-frequency clock signal after the signal transmitting device transmits the first low-frequency data signal and the first low-frequency clock signal to the signal receiving device via the HDMI fiber-optic extender and before the signal transmitting device transmits the first to third high-frequency data signals and the high-frequency clock signal, the second serializer/deserializer serializes the second low-frequency data signal and the second low-frequency clock signal from the second HDMI interface so as to generate a second control signal; the second laser driver generates a sixth drive signal based on the second control signal from the second serializer/deserializer; the second tri-direction optical sub-assembly generates a sixth optical signal based on the sixth drive signal from the second laser driver, and couples the sixth optical signal onto the second fiber-optic cable, where the sixth optical signal has a wavelength different from those of the fourth and fifth optical signals; the first tri-direction optical sub-assembly receives the sixth optical signal from the second fiber-optic cable, and converts the sixth optical signal into a sixth current signal; the first current to voltage converter performs current to voltage conversion on the sixth current signal from the first tri-direction optical sub-assembly so as to generate the second control signal; the first serializer/deserializer deserializes the second control signal from the first current to voltage converter so as to generate the second low-frequency data signal and the second low-frequency clock signal; and the first HDMI interface transmits the second low-frequency data signal and the second low-frequency clock signal from the first serializer/deserializer to the signal transmitting device.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
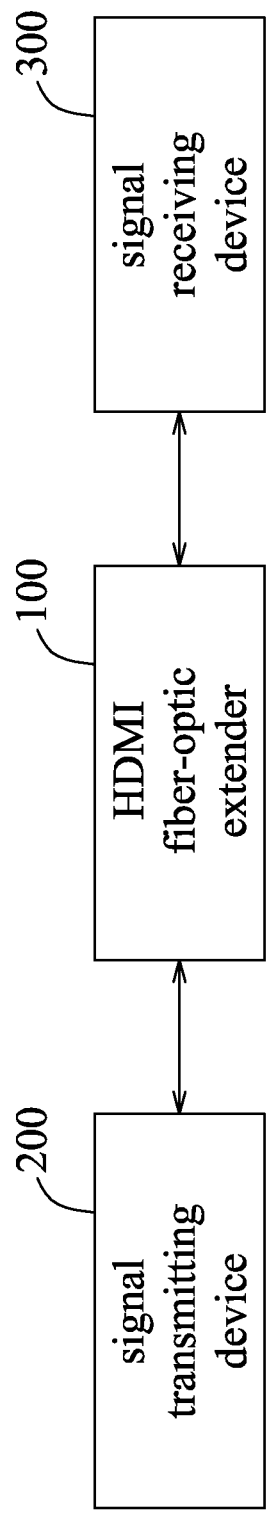
FIG. 1 is a block diagram illustrating an application environment of an embodiment of a high-definition multimedia interface (HDMI) fiber-optic extender according to the disclosure.
Figure 2:
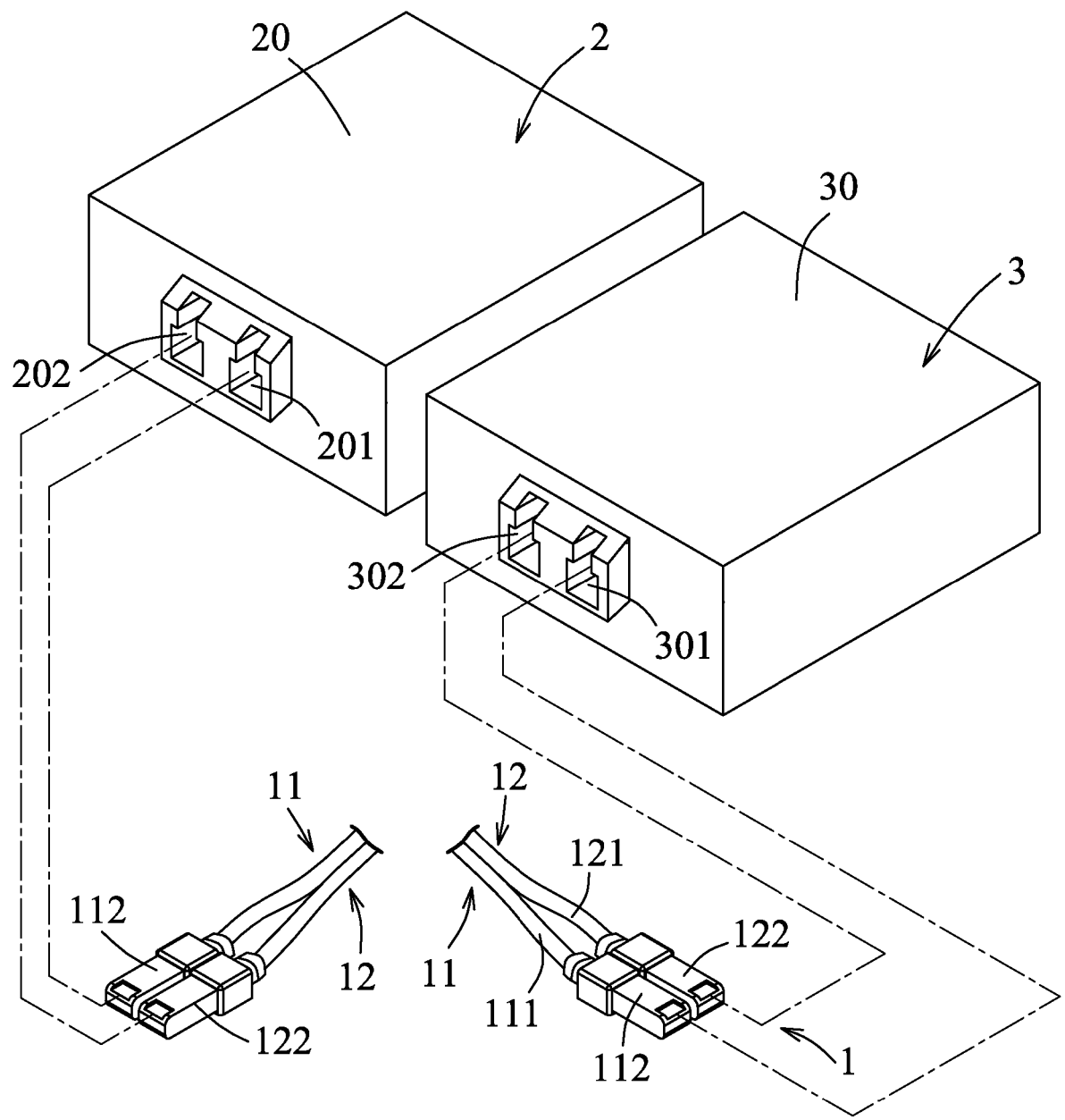
FIG. 2 is a structural diagram illustrating an HDMI optical transmitter, an HDMI optical receiver and a fiber-optic assembly of the embodiment that are not connected yet.
Figure 3:
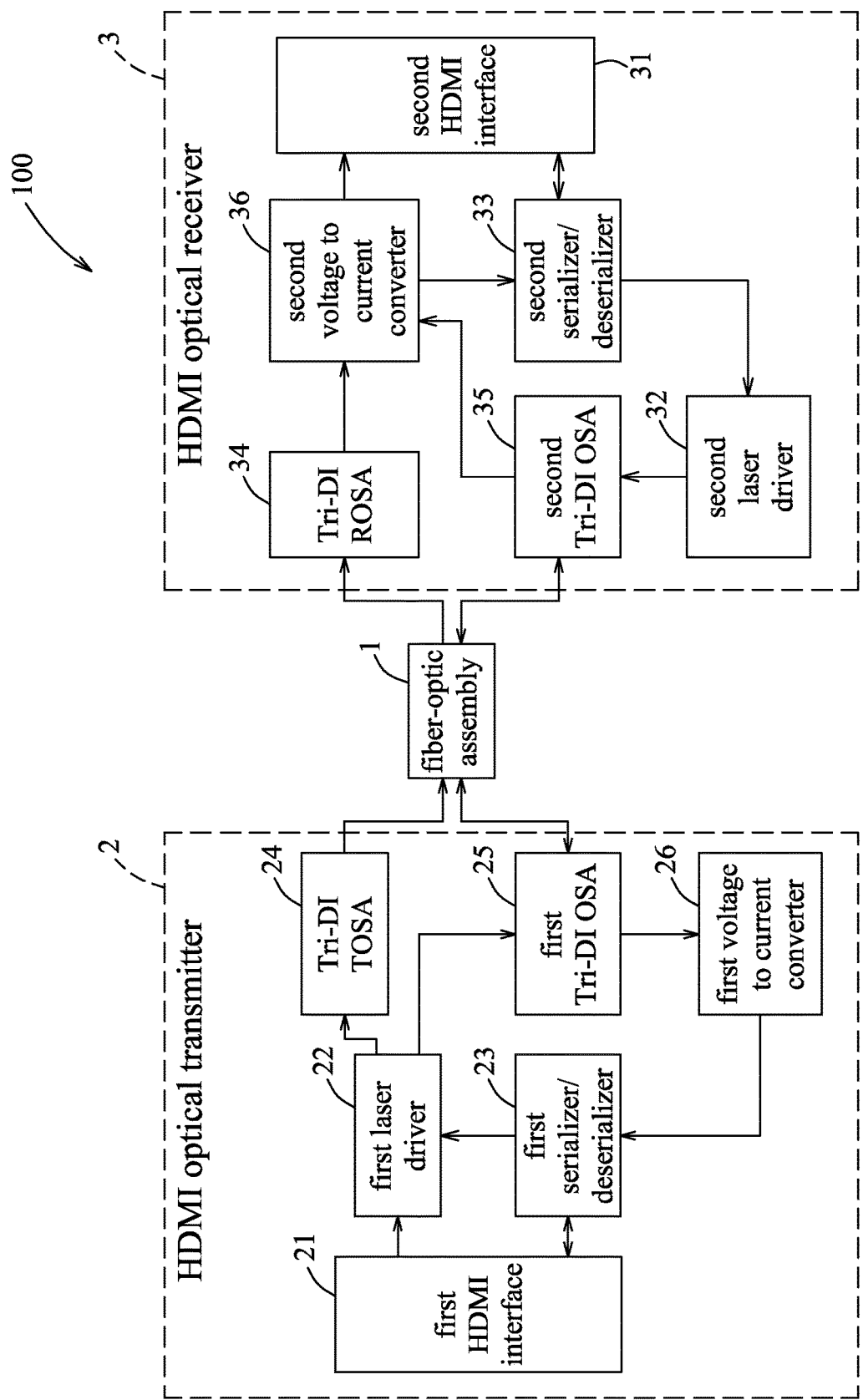
FIG. 3 is a block diagram illustrating a configuration of the embodiment.

Referring to FIGS. 1, 2 and 3, an embodiment of a high-definition multimedia interface (HDMI) fiber-optic extender 100 according to the disclosure is for providing long-distance (e.g., about 300 meters or more) signal transmission between a signal transmitting device 200 and a signal receiving device 300. In this embodiment, the signal transmitting device 200 is, for example, but not limited to, a DVD player or a digital set-top box, and the signal receiving device 300 is, for example, but not limited to, a digital TV set. The HDMI fiber-optic extender 100 of this embodiment includes a fiber-optic assembly 1, an HDMI optical transmitter 2 and an HDMI optical receiver 3.

In this embodiment, the signal transmitting device 200 generates and outputs an HDMI input. The HDMI input includes multiple HDMI signals (for example, but not limited to, a first high-frequency data signal, a second high-frequency data signal, a third high-frequency data signal, a high-frequency clock signal, a first low-frequency data signal and a first low-frequency clock signal). The first to third high-frequency data signals and the high-frequency clock signal are transmitted using, for example, transition minimized differential signaling (TMDS), and are related to video, where the first to third high-frequency data signals respectively correspond to R, G and B of the RGB model. The first low-frequency data signal and the first low-frequency clock signal are related to communication between the signal transmitting device 200 and the signal receiving device 300. However, in other embodiments, the HDMI input may further include other low-frequency control signals that are related to user electronic control. It should be noted that, the signal transmitting device 200, before actually transmitting the video related HDMI signals (i.e., the first to third high-frequency data signals and the high-frequency clock signal), communicates with the signal receiving device 300 using the first low-frequency data signal and the first low-frequency clock signal, so as to identify a resolution supported by the signal receiving device 300, such as 720P (i.e., 1280×720 pixels) or 1080P (i.e., 1920×1080 pixels). Then, the signal transmitting device 200 transmits the video related HDMI signals (i.e., the first to third high-frequency data signals and the high-frequency clock signal) that comply with the resolution of the signal receiving device 300.

As shown in FIG. 2, the fiber-optic assembly 1 includes a first fiber-optic cable 11 and a second fiber-optic cable 12. Each of the first and second fiber-optic cables 11, 12 includes a single-core optical fiber 111/121, and two connection plugs 112/122 that are respectively connected to two opposite ends of the single-core optical fiber 111/121. Each of the connection plugs 112, 122 of the first and second fiber-optic cables 11, 12 is, for example, an SC connector, an LC connector or an MTRJ connector. In this embodiment, each of the single-core optical fibers 111, 121 of the first and second fiber-optic cables 11, 12 is a multi-mode (MM) optical fiber. However, in other embodiments, each of the single-core optical fibers 111, 121 may be a single-mode (SM) optical fiber.

As shown in FIG. 2, the HDMI optical transmitter 2 includes a housing 20, a side of which is formed with a first connection socket 201 and a second connection socket 202. In this embodiment, the first connection socket 201, when in use, is connected to, for example, one of the connection plugs 112 of the first fiber-optic cable 11, and the second connection socket 202, when in use, is connected to, for example, one of the connection plugs 122 of the second fiber-optic cable 12.

As shown in FIG. 3, the HDMI optical transmitter 2 further includes a first HDMI interface 21, a first laser driver 22, a first serializer/deserializer 23, a tri-direction transmitter optical sub-assembly (Tri-DI TOSA) 24, a first tri-direction optical sub-assembly (Tri-DI OSA) 25 and a first current to voltage converter 26, where the first HDMI interface 21 is exposed from another side (not shown) of the housing 20. Specifically, the first laser driver 22, the first serializer/deserializer 23, the tri-direction transmitter optical sub-assembly 24, the first tri-direction optical sub-assembly 25 and the first current to voltage converter 26 are installed on a circuit board (not shown) that is disposed in the housing 20; and the tri-direction transmitter optical sub-assembly 24 and the first tri-direction optical sub-assembly 25 are respectively adjacent to the first and second connection sockets 201, 202 in position.

The first HDMI interface 21 is adapted to be connected to the signal transmitting device 200 via an HDMI cable (not shown), and is configured for transmission of the HDMI signals.

The first serializer/deserializer 23 is connected to the first HDMI interface 21, and is configured to perform serialization and deserialization of low-frequency signals using serial communication technology such as time-division multiplexing (TDM) or point-to-point (P2P) technology.

The first laser driver 22 is connected to the first HDMI interface 21 and the first serializer/deserializer 23, and is configured to generate at least one drive signal based on at least one signal from the first HDMI interface 21 or the first serializer/deserializer 23.

Figure 4:
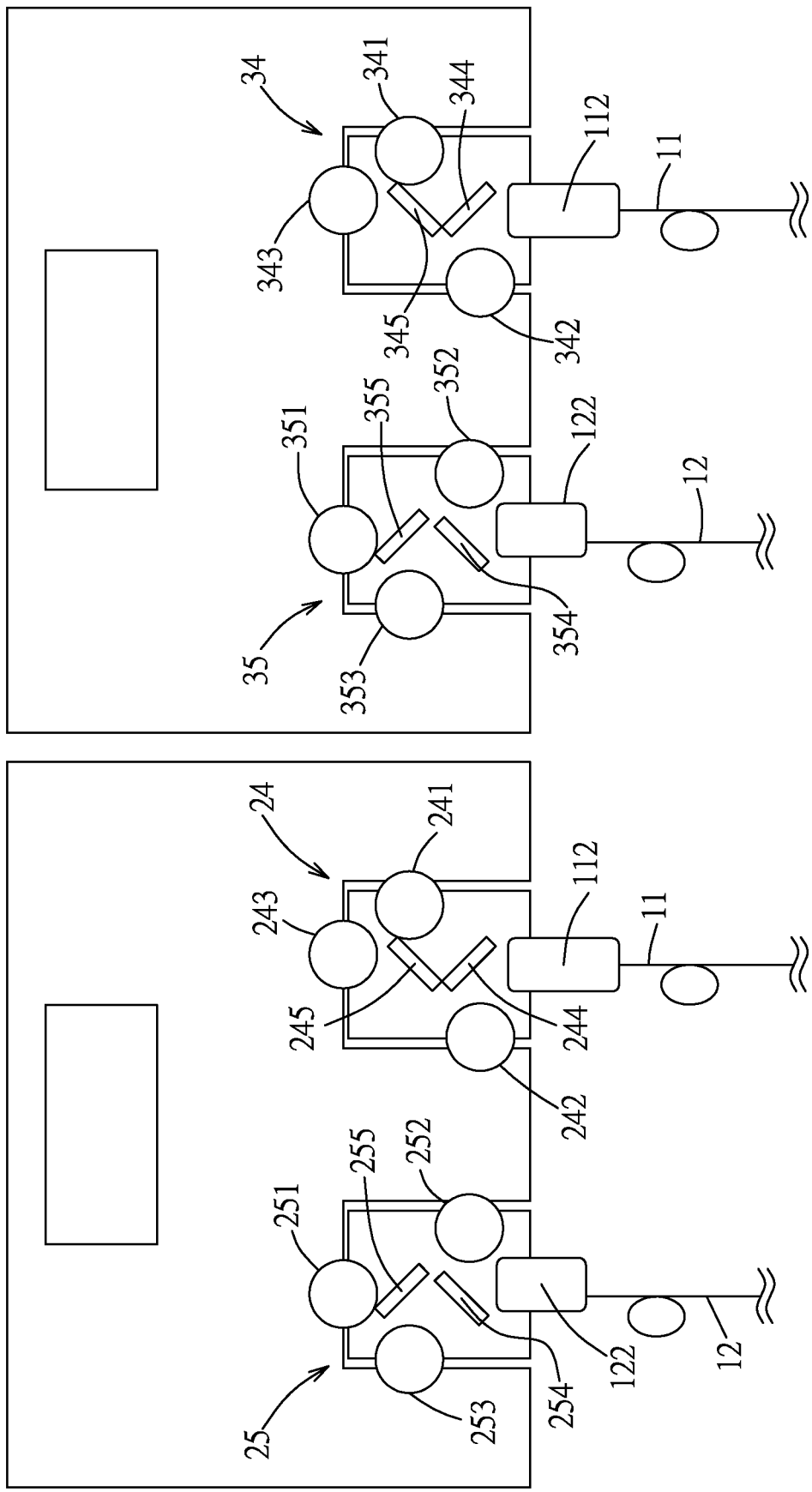
FIG. 4 is a schematic diagram illustrating an arrangement of a tri-direction transmitter optical sub-assembly and a first tri-direction optical sub-assembly of the HDMI optical transmitter, a tri-direction receiver optical sub-assembly and a second tri-direction optical sub-assembly of the HDMI optical receiver, and the fiber-optic assembly.

The tri-direction transmitter optical sub-assembly 24 is connected to the first laser driver 22, and is configured to generate at least one optical signal based on the at least one drive signal from the first laser driver 22, and to couple the at least one optical signal onto the first fiber-optic cable 11 of the fiber-optic assembly 1. In this embodiment, the tri-direction transmitter optical sub-assembly 24 can serve as a signal combiner. Specifically, as shown in FIG. 4, the tri-direction transmitter optical sub-assembly 24 includes a first laser diode 241, a second laser diode 242, a third laser diode 243, a first optical splitter 244 and a second optical splitter 245, where the first to third laser diodes 241-243 are connected to the first laser driver 22.

The first tri-direction optical sub-assembly 25 is connected to the first laser driver 22, and is configured to generate multiple optical signals based on multiple drive signals from the first laser driver 22, and to couple the optical signals onto the second fiber-optic cable 12 of the fiber-optic assembly 1. The first tri-direction optical sub-assembly 25 is further configured to convert an optical signal from the second fiber-optic cable 12 into a current signal. In this embodiment, the first tri-direction optical sub-assembly 25 can serve as a signal combiner or a signal splitter. Specifically, as shown in FIG. 4, the first tri-direction optical sub-assembly 25 includes a fourth laser diode 251, a fifth laser diode 252, a first photodiode 253, a third optical splitter 254 and a fourth optical splitter 255, where the fourth and fifth laser diodes 251, 252 are connected to the first laser driver 22.

The first current to voltage converter 26 is connected to the first photodiode 253 (see FIG. 4) of the first tri-direction optical sub-assembly 25 and the first serializer/deserializer 23, and is configured to perform current to voltage conversion on the current signal from the first tri-direction optical sub-assembly 25 so as to generate a control signal that is to be deserialized by the first serializer/deserializer 23. In this embodiment, the first current to voltage converter 26 includes a transimpedance amplifier (TIA) (not shown) for converting an analog current signal into a voltage signal, and a limiting amplifier (LIA) (not shown) for performing limiting amplification on the voltage signal so as to generate a digital control signal.

As shown in FIG. 2, the HDMI optical receiver 3 includes a housing 30, a side of which is formed with a third connection socket 301 and a fourth connection socket 302. In this embodiment, the third connection socket 301, when in use, is connected to, for example, the other one of the connection plugs 112 of the first fiber-optic cable 11, and the fourth connection socket 302, when in use, is connected to, for example, the other one of the connection plugs 122 of the second fiber-optic cable 12.

As shown in FIG. 3, the HDMI optical receiver 3 further includes a second HDMI interface 31, a second laser driver 32, a second serializer/deserializer 33, a tri-direction receiver optical sub-assembly (Tri-DI ROSA) 34, a second tri-direction optical sub-assembly 35 and a second current to voltage converter 36, where the second HDMI interface 31 is exposed from another side (not shown) of the housing 30. Specifically, the second laser driver 32, the second serializer/deserializer 33, the tri-direction receiver optical sub-assembly 34, the second tri-direction optical sub-assembly 35 and the second current to voltage converter 36 are installed on a circuit board (not shown) that is disposed in the housing 30; and the tri-direction receiver optical sub-assembly 34 and the second tri-direction optical sub-assembly 35 are respectively adjacent to the third and fourth connection sockets 301, 302 in position.

The second HDMI interface 31 is adapted to be connected to the signal receiving device 300 via an HDMI cable (not shown), and is configured for transmission of the HDMI signals.

The second serializer/deserializer 33 is connected to the second HDMI interface 31, is similar to the first serializer/deserializer 23 in function, and is configured to perform serialization and deserialization of low-frequency signals.

The tri-direction receiver optical sub-assembly 34 is configured to receive the at least one optical signal from the first fiber-optic cable 11 of the fiber-optic assembly 1, and to convert the at least one optical signal into at least one current signal. In this embodiment, the tri-direction receiver optical sub-assembly 34 can serve as a signal splitter. Specifically, as shown in FIG. 4, the tri-direction receiver optical sub-assembly 34 includes a second photodiode 341, a third photodiode 342, a fourth photodiode 343, a fifth optical splitter 344 and a sixth optical splitter 345.

The second laser driver 32 is connected to the second serializer/deserializer 33, and is configured to generate a drive signal based on a signal from the second serializer/deserializer 33.

The second tri-direction optical sub-assembly 35 is connected to the second laser driver 32, and is configured to generate an optical signal based on the drive signal from the second laser driver 32, and to couple the optical signal onto the second fiber-optic cable 12 of the fiber-optic assembly 1. The second tri-direction optical sub-assembly 35 is further configured to convert the optical signals from the second fiber-optic cable 12 into multiple current signals. In this embodiment, the second tri-direction optical sub-assembly 35 can serve as a signal combiner or a signal splitter. Specifically, as shown in FIG. 4, the second tri-direction optical sub-assembly 35 includes a fifth photodiode 351, a sixth photodiode 352, a sixth laser diode 353, a seventh optical splitter 354 and an eighth optical splitter 355, where the sixth laser diode 353 is connected to the second laser driver 32.

The second current to voltage converter 36 is connected to the second HDMI interface 31, the second to fourth photodiodes 341-343 (see FIG. 4) of the tri-direction receiver optical sub-assembly 34, the fifth and sixth photodiodes 351, 352 of the second tri-direction optical sub-assembly 35 and the second serializer/deserializer 33, has a similar circuit layout to the first current to voltage converter 26, and is configured to perform current to voltage conversion on at least one current signal from the tri-direction receiver optical sub-assembly 34 and/or the second tri-direction optical sub-assembly 35 so as to generate at least one signal that is to be received by the second HDMI interface 31 or to be deserialized by the second serializer/deserializer 33.

It should be noted that, in this embodiment, each of the first, third, fifth and seventh optical splitters 244, 254, 344, 354 is a filtering optical splitter that can filter out an optical signal having a wavelength of, for example, 850 nm; and each of the second, fourth, sixth and eighth optical splitters 245, 255, 345, 355 is a filtering optical splitter that can filter out an optical signal having a wavelength of, for example, 1550 nm. However, the disclosure is not limited to this configuration. In other embodiments, when each of the single-core optical fibers 111, 121 is a single-mode optical fiber, each of the first, third, fifth and seventh optical splitters 244, 254, 344, 354 may be a filtering optical splitter that can filter out an optical signal having a wavelength of, for example, 1310 nm.

Figure 5:
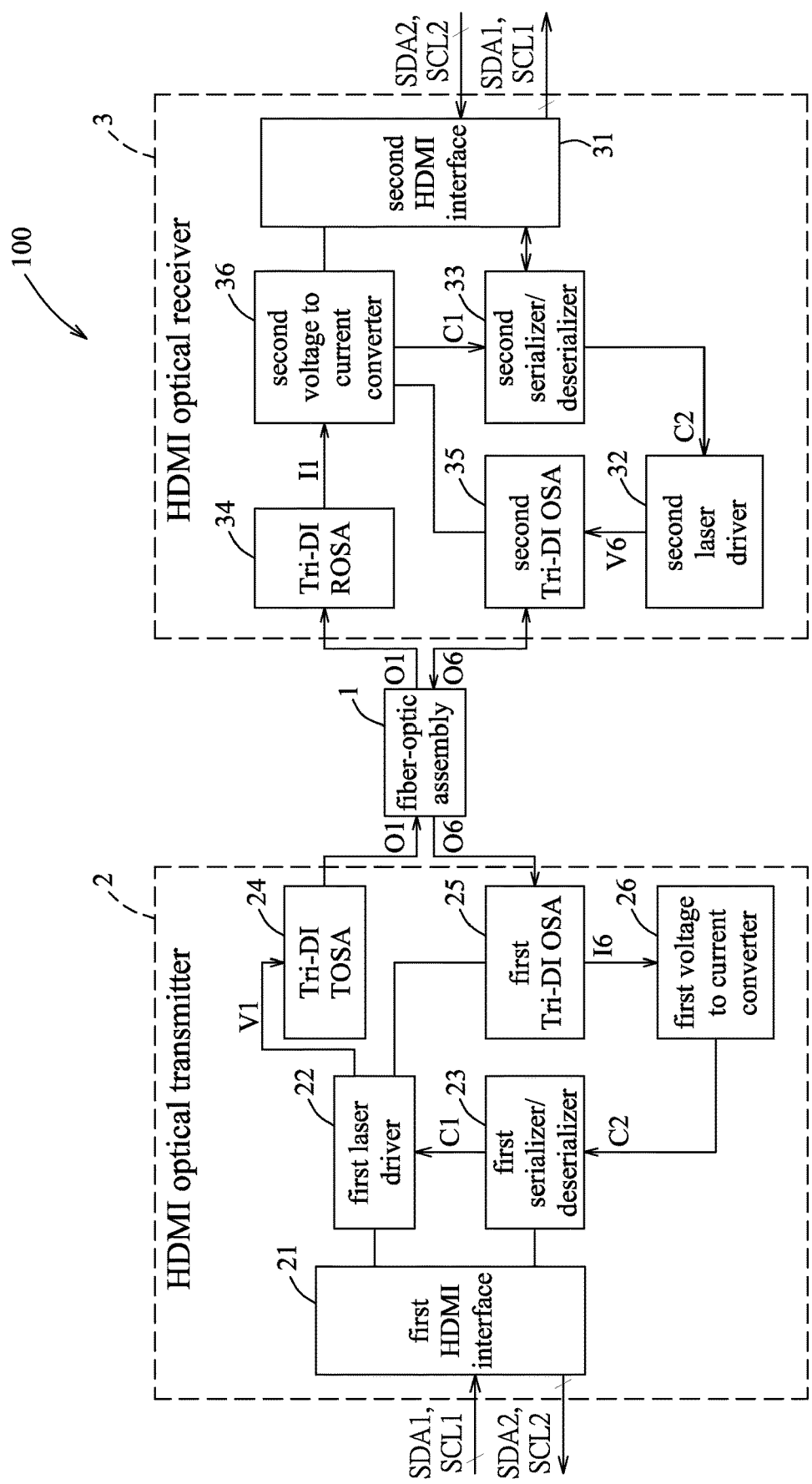
FIG. 5 is a block diagram illustrating how the embodiment transmits communication related HDMI signals in a communication phase before actually transmitting video related HDMI signals.

Referring to FIGS. 4 and 5, the HDMI fiber-optic extender 100 of this embodiment transmits the communication related HDMI signals in a communication phase of the signal transmitting device 200 and the signal receiving device 300 before the signal transmitting device 200 actually transmits the video related HDMI signals. The way in which this is done will be described in detail below.

The first HDMI interface 21 receives the first low-frequency data signal (SDA1) and the first low-frequency clock signal (SCL1) from the signal transmitting device 200, and transmits the first low-frequency data signal (SDA1) and the first low-frequency clock signal (SCL1) to the first serializer/deserializer 23. The first serializer/deserializer 23 serializes the first low-frequency data signal (SDA1) and the first low-frequency clock signal (SCL1) from the first HDMI interface 21 so as to generate a first control signal (C1). The first laser driver 22 generates a first drive signal (V1) having a wavelength of, for example, 1550 nm based on the first control signal (C1) from the first serializer/deserializer 23.

The first laser diode 241 of the tri-direction transmitter optical sub-assembly 24 generates a first optical signal (O1) based on the first drive signal (V1) from the first laser driver 22. The first optical signal (O1) generated by the first laser diode 241 enters the first fiber-optic cable 11 after being reflected by the second optical splitter 245 and passing the first optical splitter 244. The first optical signal (O1) transmitted on the first fiber-optic cable 11 is received by the second photodiode 341 of the tri-direction receiver optical sub-assembly 34 after passing the fifth optical splitter 344 and being reflected by the sixth optical splitter 345. The second photodiode 341 converts the first optical signal (O1) from the first fiber-optic cable 11 into a first current signal (I1). The second current to voltage converter 36 converts the first current signal (I1) from the second photodiode 341 into the first control signal (C1). The second serializer/deserializer 33 deserializes the first control signal (C1) from the second current to voltage converter 36 so as to generate the first low-frequency data signal (SDA1) and the first low-frequency clock signal (SCL1). The second HDMI interface 31 transmits the first low-frequency data signal (SDA1) and the first low-frequency clock signal (SCL1) from the second serializer/deserializer 33 to the signal receiving device 300.

The signal receiving device 300 generates a second low-frequency data signal (SDA2) and a second low-frequency clock signal (SCL2) that are related to a resolution thereof in response to the first low-frequency data signal (SDA1) and the first low-frequency clock signal (SCL1).

The second HDMI interface 31 receives the second low-frequency data signal (SDA2) and the second low-frequency clock signal (SCL2) from the signal receiving device 300, and transmits the second low-frequency data signal (SDA2) and the second low-frequency clock signal (SCL2) to the second serializer/deserializer 33. The second serializer/deserializer 33 serializes the second low-frequency data signal (SDA2) and the second low-frequency clock signal (SCL2) from the second HDMI interface 31 so as to generate a second control signal (C2). The second laser driver 32 generates a sixth drive signal (V6) based on the second control signal (C2) from the second serializer/deserializer 33. In this embodiment, the sixth drive signal (V6) has a wavelength that is the same as the wavelength of the first drive signal (V1) (i.e., 1550 nm). The sixth laser diode 353 of the second tri-direction optical sub-assembly 35 generates a sixth optical signal (O6) based on the sixth drive signal (V6) from the second laser driver 31. The sixth optical signal (O6) generated by the sixth laser diode 353 enters the second fiber-optic cable 12 after being reflected by the eighth optical splitter 355 and passing the seventh optical splitter 354. The sixth optical signal (O6) transmitted on the second fiber-optic cable 12 is received by the first photodiode 253 of the first tri-direction optical sub-assembly 25 after passing the third optical splitter 254 and being reflected by the fourth optical splitter 255. The first photodiode 253 converts the sixth optical signal (O6) from the second fiber-optic cable 12 into a sixth current signal (I6). The first current to voltage converter 26 converts the sixth current signal (I6) from the first photodiode 253 into the second control signal (C2). The first serializer/deserializer 23 deserializes the second control signal (C2) from the first current to voltage converter 26 so as to generate the second low-frequency data signal (SDA2) and the second low-frequency clock signal (SCL2). The first HDMI interface 21 transmits the second low-frequency data signal (SDA2) and the second low-frequency clock signal (SCL2) from the first serializer/deserializer 23 to the signal transmitting device 200.

At this time, the communication between the signal transmission device 200 and the signal receiving device 300 is completed. Then, the signal transmission device 200 identifies the resolution of the signal receiving device 300 based on the second low-frequency data signal (SDA2) and the second low-frequency clock signal (SCL2), and generates and outputs the video related HDMI signals (i.e., the first to third high-frequency data signals (D1-D3) respectively corresponding to R, G and B, and the high-frequency clock signal (CL)) that comply with the resolution of the signal receiving device 300 to the HDMI fiber-optic extender 100 of this embodiment.

Figure 6:
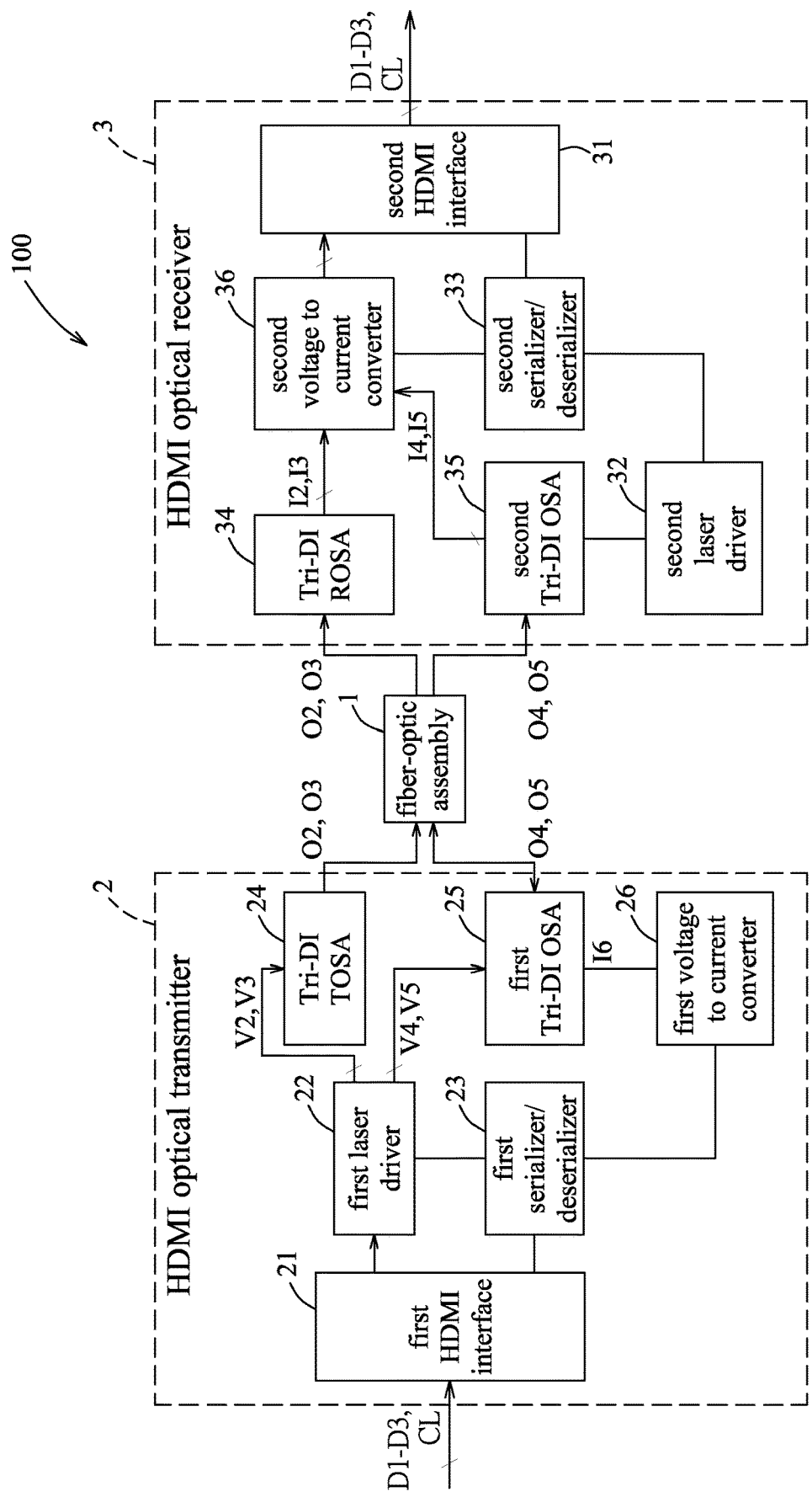
FIG. 6 is a block diagram illustrating how the embodiment transmits the video related HDMI signals.

Referring to FIGS. 4 and 6, the HDMI fiber-optic extender 100 of this embodiment transmits the video related HDMI signals (i.e., the first to third high-frequency data signals (D1-D3) and the high-frequency clock signal (CL)). The way in which this is done will be described in detail below.

The first HDMI interface 21 receives the first to third high-frequency data signals (D1-D3) and the high-frequency clock signal (CL) from the signal transmitting device 200, and transmits the first to third high-frequency data signals (D1-D3) and the high-frequency clock signal (CL) to the first laser driver 22. The first laser driver 22 generates a second drive signal (V2), a third drive signal (V3), a fourth drive signal (V4) and a fifth drive signal (V5) respectively based on the first to third high-frequency data signals (D1-D3) and the high-frequency clock signal (CL) from the first HDMI interface 22.

The tri-direction transmitter optical sub-assembly 24 generates a second optical signal (O2) and a third optical signal (O3) respectively based on the second and third drive signals (V2, V3) from the first laser driver 22, and couples the second and third optical signals (O2, O3) onto the first fiber-optic cable 11, where the second optical signal (O2) has a wavelength of, for example, 850 nm, and the third optical signal (O3) has a wavelength of, for example, 1310 nm. In other words, the first to third optical signals (O1-O3) have different wavelengths. Specifically, the second laser diode 242 of the tri-direction transmitter optical sub-assembly 24 generates the second optical signal (O2) based on the second drive signal (V2). The second optical signal (O2) generated by the second laser diode 242 enters the first fiber-optic cable 11 after being reflected by the first optical splitter 244. The third laser diode 243 of the tri-direction transmitter optical sub-assembly 24 generates the third optical signal (O3) based on the third drive signal (V3). The third optical signal (O3) generated by the third laser diode 243 enters the first fiber-optic cable 11 after passing the first and second optical splitters 244, 245.

The first tri-direction optical sub-assembly 25 generates a fourth optical signal (O4) and a fifth optical signal (O5) respectively based on the fourth and fifth drive signals (V4, V5) from the first laser driver 22, and couples the fourth and fifth optical signals (O4, O5) onto the second fiber-optic cable 12, where the fourth optical signal (O4) has a wavelength that is the same as the wavelength of the third optical signal (O3) (i.e., 1310 nm), and the fifth optical signal (O5) has a wavelength that is the same as the wavelength of the second optical signal (O2) (i.e., 850 nm). In other words, the fourth to sixth optical signals (O4-O6) have different wavelengths. Specifically, the fourth laser diode 251 of the first tri-direction optical sub-assembly 25 generates the fourth optical signal (O4) based on the fourth drive signal (V4). The fourth optical signal (O4) generated by the fourth laser diode 251 enters the second fiber-optic cable 12 after passing the fourth optical splitter 255 and the third optical splitter 254. The fifth laser diode 252 of the first tri-direction optical sub-assembly 25 generates the fifth optical signal (O5) based on the fifth drive signal (V5). The fifth optical signal (O5) generated by the fifth laser diode 252 enters the second fiber-optic cable 12 after being reflected by the third optical splitter 254.

The second and third optical signals (O2, O3) are transmitted on the first fiber-optic cable 11 while the fourth and fifth optical signals (O4, O5) are transmitted on the second fiber-optic cable 12. In this embodiment, a length of each of the first and second fiber-optic cables 11, 12 can reach about 300 meters. However, in other embodiments where the single-core optical fiber 111/121 of each of the first and second fiber-optic cables 11, 12 is a single-mode optical fiber, the length of each of the first and second fiber-optic cables 11, 12 may even be increased to about 5 km.

The tri-direction receiver optical sub-assembly 34 receives the second and third optical signals (O2, O3) from the first fiber-optic cable 11, and converts the second and third optical signals (O2, O3) respectively into a second current signal (I2) and a third current signal (I3). Specifically, the second optical signal (O2) transmitted on the first fiber-optic cable 11 is received by the third photodiode 342 of the tri-direction receiver optical sub-assembly 34 after being reflected by the fifth optical splitter 344. The third photodiode 342 converts the second optical signal (O2) from the first fiber-optic cable 11 into the second current signal (I2). The third optical signal (O3) transmitted on the first fiber-optic cable 11 is received by the fourth photodiode 343 of the tri-direction receiver optical sub-assembly 34 after passing the fifth and sixth optical splitters 344, 345. The fourth photodiode 343 converts the third optical signal (O3) from the first fiber-optic cable 11 into the third current signal (I3).

The second tri-direction optical sub-assembly 35 receives the fourth and fifth optical signals (O4, O5) from the second fiber-optic cable 12, and converts the fourth and fifth optical signals (O4, O5) respectively into a fourth current signal (I4) and a fifth current signal (I5). Specifically, the fourth optical signal (O4) transmitted on the second fiber-optic cable 12 is received by the fifth photodiode 351 of the second tri-direction optical sub-assembly 35 after passing the seventh and eighth optical splitters 354, 355. The fifth photodiode 351 converts the fourth optical signal (O4) from the second fiber-optic cable 12 into the fourth current signal (I4). The fifth optical signal (O5) transmitted on the second fiber-optic cable 12 is received by the sixth photodiode 352 of the second tri-direction optical sub-assembly 35 after being reflected by the seventh optical splitter 354. The sixth photodiode 352 converts the fifth optical signal (O5) from the second fiber-optic cable 12 into the fifth current signal (I5).

The second current to voltage converter 36 converts the second to fifth current signals (I2-I5) from the tri-direction receiver optical sub-assembly 34 and the second tri-direction optical sub-assembly 35 respectively into the first to third high-frequency data signals (D1-D3) and the high-frequency clock signal (CL). The second HDMI interface 31 transmits the first to third high-frequency data signals (D1-D3) and the high-frequency clock signal (CL) from the second current to voltage converter 36 to the signal receiving device 300.

In view of the above, since the HDMI fiber-optic extender 100 of this embodiment uses the tri-direction transmitter optical sub-assembly 24, the first tri-direction optical sub-assembly 25, the tri-direction receiver optical sub-assembly 34, the second tri-direction optical sub-assembly 35 and a pair of single-core optical fibers 111, 121, the video related HDMI signals can be effectively transmitted without undergoing encoding and decoding (compression and decompression) by specific digital signal processors, which can effectively avoid problems such as incompatibility between the signal transmitting device 200 and the signal receiving device 300, signal distortion, and difficulty in increasing the data rate and the resolution, so as to ensure signal transmission quality and increase the data transmission rate while minimizing cost.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A high-definition multimedia interface (HDMI) fiber-optic extender for providing long-distance signal transmission between a signal transmitting device and a signal receiving device, said HDMI fiber-optic extender comprising:

a fiber-optic assembly including a first fiber-optic cable and a second fiber-optic cable, each of said first and second fiber-optic cables including a single-core optical fiber, and two connection plugs respectively connected to two opposite ends of said single-core optical fiber;

an HDMI optical transmitter formed with a first connection socket that is connected to one of said connection plugs of said first fiber-optic cable, and a second connection socket that is connected to one of said connection plugs of said second fiber-optic cable, said HDMI optical transmitter including a first HDMI interface configured to receive an HDMI input from the signal transmitting device, the HDMI input including a first high-frequency data signal, a second high-frequency data signal, a third high-frequency data signal, a high-frequency clock signal, a first low-frequency data signal and a first low-frequency clock signal, the first to third high-frequency data signals and the high-frequency clock signal being related to video, the first low-frequency data signal and the first low-frequency clock signal being related to communication between the signal transmitting device and the signal receiving device, a first serializer/deserializer connected to said first HDMI interface, and configured to serialize the first low-frequency data signal and the first low-frequency clock signal from said first HDMI interface so as to generate a first control signal, a first laser driver connected to said first HDMI interface and said first serializer/deserializer, and configured to generate a first drive signal, a second drive signal, a third drive signal, a fourth drive signal and a fifth drive signal respectively based on the first control signal from said first serializer/deserializer and the first to third high-frequency data signals and the high-frequency clock signal from said first HDMI interface, a tri-direction transmitter optical sub-assembly connected to said first laser driver, and configured to generate a first optical signal, a second optical signal and a third optical signal respectively based on the first to third drive signals from said first laser driver, and to couple the first to third optical signals onto said first fiber-optic cable, the first to third optical signals having different wavelengths, a first tri-direction optical sub-assembly connected to said first laser driver, and configured to generate a fourth optical signal and a fifth optical signal respectively based on the fourth and fifth drive signals from said first laser driver, and to couple the fourth and fifth optical signals onto said second fiber-optic cable, the fourth and fifth optical signals having different wavelengths, and a first current to voltage converter connected to said first tri-direction optical sub-assembly and said first serializer/deserializer; and an HDMI optical receiver formed with a third connection socket that is connected to the other one of said connection plugs of said first fiber-optic cable, and a fourth connection socket that is connected to the other one of said connection plugs of said second fiber-optic cable, said HDMI optical receiver including a tri-direction receiver optical sub-assembly configured to receive the first to third optical signals from said first fiber-optic cable, and to convert the first to third optical signals respectively into a first current signal, a second current signal and a third current signal, a second tri-direction optical sub-assembly configured to receive the fourth and fifth optical signals from said second fiber-optic cable, and to convert the fourth and fifth optical signals respectively into a fourth current signal and a fifth current signal, a second current to voltage converter connected to said tri-direction receiver optical sub-assembly and said second tri-direction optical sub-assembly, and configured to perform current to voltage conversion on the first to fifth current signals from said tri-direction receiver optical sub-assembly and said second tri-direction optical sub-assembly so as to respectively generate the first control signal, the first to third high-frequency data signals and the high-frequency clock signal, a second laser driver connected to said second tri-direction optical sub-assembly, a second serializer/deserializer connected to said second laser driver and said second current to voltage converter, and configured to deserialize the first control signal from said second current to voltage converter so as to generate the first low-frequency data signal and the first low-frequency clock signal, and a second HDMI interface connected to said second current to voltage converter and said second serializer/deserializer, and configured to transmit the first to third high-frequency data signals and the high-frequency clock signal from said second current to voltage converter and the first low-frequency data signal and the first low-frequency clock signal from said second serializer/deserializer to the signal receiving device;

wherein, when said second HDMI interface receives a second low-frequency data signal and a second low-frequency clock signal that are generated by the signal receiving device in response to the first low-frequency data signal and the first low-frequency clock signal after the signal transmitting device transmits the first low-frequency data signal and the first low-frequency clock signal to the signal receiving device via said HDMI fiber-optic extender and before the signal transmitting device transmits the first to third high-frequency data signals and the high-frequency clock signal, said second serializer/deserializer serializes the second low-frequency data signal and the second low-frequency clock signal from said second HDMI interface so as to generate a second control signal, said second laser driver generates a sixth drive signal based on the second control signal from said second serializer/deserializer, said second tri-direction optical sub-assembly generates a sixth optical signal based on the sixth drive signal from said second laser driver, and couples the sixth optical signal onto said second fiber-optic cable, the sixth optical signal having a wavelength different from those of the fourth and fifth optical signals, said first tri-direction optical sub-assembly receives the sixth optical signal from said second fiber-optic cable, and converts the sixth optical signal into a sixth current signal, said first current to voltage converter performs current to voltage conversion on the sixth current signal from said first tri-direction optical sub-assembly so as to generate the second control signal, said first serializer/deserializer deserializes the second control signal from said first current to voltage converter so as to generate the second low-frequency data signal and the second low-frequency clock signal, and said first HDMI interface transmits the second low-frequency data signal and the second low-frequency clock signal from said first serializer/deserializer to the signal transmitting device.

2. The HDMI fiber-optic extender as claimed in claim 1, wherein:

said tri-direction transmitter optical sub-assembly includes a first laser diode that generates the first optical signal based on the first drive signal, a second laser diode that generates the second optical signal based on the second drive signal, a third laser diode that generates the third optical signal based on the third drive signal, a first optical splitter and a second optical splitter;

said first to third laser diodes and said first and second optical splitters are arranged in such a way that the first optical signal generated by said first laser diode enters said first fiber-optic cable after being reflected by said second optical splitter and passing said first optical splitter, the second optical signal generated by said second laser diode enters said first fiber-optic cable after being reflected by said first optical splitter, and the third optical signal generated by said third laser diode enters said first fiber-optic cable after passing said first and second optical splitters;

said first tri-direction optical sub-assembly includes a fourth laser diode that generates the fourth optical signal based on the fourth drive signal, a fifth laser diode that generates the fifth optical signal based on the fifth drive signal, a first photodiode that converts the sixth optical signal from said second fiber-optic cable into the sixth current signal, a third optical splitter and a fourth optical splitter;

said fourth and fifth laser diodes, said first photodiode and said third and fourth optical splitters are arranged in such a way that the fourth optical signal generated by said fourth laser diode enters said second fiber-optic cable after passing said third and fourth optical splitters, the fifth optical signal generated by said fifth laser diode enters said second fiber-optic cable after being reflected by said third optical splitter, and the sixth optical signal transmitted on said second fiber-optic cable is received by said first photodiode after passing said third optical splitter and being reflected by said fourth optical splitter;

said tri-direction receiver optical sub-assembly includes a second photodiode that converts the first optical signal from said first fiber-optic cable into the first current signal, a third photodiode that converts the second optical signal from said first fiber-optic cable into the second current signal, a fourth photodiode that converts the third optical signal from said first fiber-optic cable into the third current signal, a fifth optical splitter and a sixth optical splitter;

said second to fourth laser diodes and said fifth and sixth optical splitters are arranged in such a way that the first optical signal transmitted on said first fiber-optic cable is received by said second photodiode after passing said fifth optical splitter and being reflected by said sixth optical splitter, the second optical signal transmitted on said first fiber-optic cable is received by said third photodiode after being reflected by said fifth optical splitter, and the third optical signal transmitted on said first fiber-optic cable is received by said fourth photodiode after passing said fifth and sixth optical splitters;

said second tri-direction optical sub-assembly includes a fifth photodiode that converts the fourth optical signal from said second fiber-optic cable into the fourth current signal, a sixth photodiode that converts the fifth optical signal from said second fiber-optic cable into the fifth current signal, a sixth laser diode that generates the sixth optical signal based on the sixth drive signal, a seventh optical splitter and an eighth optical splitter; and said fifth and sixth photodiodes, said sixth laser diode and said seventh and eighth optical splitters are arranged in such a way that the fourth optical signal transmitted on said second fiber-optic cable is received by said fifth photodiode after passing said seventh and eighth optical splitters, the fifth optical signal transmitted on said second fiber-optic cable is received by said sixth photodiode after being reflected by said seventh optical splitter, and the sixth optical signal generated by said sixth laser diode enters said second fiber-optic cable after being reflected by said eighth optical splitter and passing said seventh optical splitter.

* * * * *